US008026500B2

(12) United States Patent
Morimoto

(10) Patent No.: US 8,026,500 B2
(45) Date of Patent: Sep. 27, 2011

(54) PAPER CARRYING DEVICE, DOCUMENT SCANNING APPARATUS, AND PRINTING APPARATUS THAT DETECTS ERROR OF SENSOR OUTPUT SIGNAL

(75) Inventor: Satoshi Morimoto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 443 days.

(21) Appl. No.: 12/203,537

(22) Filed: Sep. 3, 2008

(65) Prior Publication Data

US 2009/0060532 A1 Mar. 5, 2009

(30) Foreign Application Priority Data

Sep. 5, 2007 (JP) ................................ 2007-230764

(51) Int. Cl.
*G01N 21/86* (2006.01)
*G01V 8/00* (2006.01)

(52) U.S. Cl. ............ 250/559.4; 250/559.29; 271/10.03; 271/265.01

(58) Field of Classification Search ................. 271/4.02, 271/4.03, 10.02, 10.03, 109, 110, 265.01, 271/265.02; 250/223 R, 559.4, 559.36, 559.29; 347/16, 19, 249, 5, 14
See application file for complete search history.

(56) References Cited

U.S. PATENT DOCUMENTS 6,256,119 B1 * 7/2001 Isozaki ........................ 358/498
2005/0231544 A1 10/2005 Takeishi
2006/0045601 A1 * 3/2006 Endo ............................ 400/642

FOREIGN PATENT DOCUMENTS

| | | | |
|---|---|---|---|
| JP | 5-105283 | A | 4/1993 |
| JP | 07-061651 | | 3/1995 |
| JP | 7-61651 | A | 3/1995 |
| JP | 8-12184 | A | 1/1996 |
| JP | 2001-31289 | A | 2/2001 |
| JP | 2003-252482 | A | 9/2003 |
| JP | 2005-272022 | A | 10/2005 |
| JP | 2005-298114 | A | 10/2005 |

* cited by examiner

*Primary Examiner* — Francis M Legasse, Jr.
(74) *Attorney, Agent, or Firm* — Birch, Stewart, Kolasch & Birch, LLP

(57) ABSTRACT

A paper carrying device includes a carrying path, a light sensor, a contact sensor, and a judgment section. Both of the light sensor and the contact sensor output a presence-signal indicating that paper exists at a predetermined position in the carrying path or an absence-signal indicating that paper does not exist at the predetermined position. The judgment section judges that a signal output from the light sensor is an error when the light sensor outputs the presence-signal while the contact sensor outputs the absence-signal.

12 Claims, 10 Drawing Sheets

PAPER CARRYING DEVICE, DOCUMENT SCANNING APPARATUS, AND PRINTING APPARATUS THAT DETECTS ERROR OF SENSOR OUTPUT SIGNAL

This Nonprovisional application claims priority under U.S.C. §119(a) on Patent Application No. 230764/2007 filed in Japan on Sep. 5, 2007, the entire contents of which are hereby incorporated by reference.

FIELD OF THE INVENTION

The present invention relates to a paper carrying device included in a document scanning apparatus or a printing apparatus.

BACKGROUND OF THE INVENTION

A document scanning apparatus (scanner) with a document carrying system is provided with a paper carrying device for carrying paper (document) to be read. A printing apparatus such as a printer, a copying machine, and a multi-function printer is provided with a paper carrying device for carrying printing paper. The paper carrying device is provided with a paper detection sensor for detecting whether paper exists at a predetermined judgment position in a carrying path.

The paper carrying device can be aware of paper jam in accordance with an output signal of the paper detection sensor. To be specific, when a paper-presence-signal indicating that paper exists at the judgment position continues to be output for a predetermined time or more, a control section of the paper carrying device judges that paper jam occurs at the judgment position.

When carrying a plurality of paper per unit job, the paper carrying device carries paper one by one. In order to ensure a predetermined distance between paper and subsequent paper (distance between carried paper and subsequently carried paper), the paper carrying device controls timing with which carriage of paper starts, in accordance with an output from the paper detection sensor. Specifically, the control section of the paper carrying device judges that a front end of paper a passes the judgment position in a carrying path, in accordance with the fact that the output from the paper detection sensor changes from a paper-absence-signal to a paper-presence signal. When the output from the paper detection sensor changes again to the paper-absence-signal within a predetermined time after the output has changed to the paper-presence-signal, the control section judges that a rear end of the paper a passes the judgment position and starts carriage of paper b to be carried next. Thus, there is provided a distance between paper a and paper b (distance between paper and subsequent paper) that corresponds to a distance between a waiting position (tray) of paper before carriage and the judgment position.

Known examples of the paper detection sensor include: a contact sensor (actuator) for detecting the presence of paper in a carrying path by directly contacting the paper in the carrying path; and a light sensor for detecting the presence of paper in the carrying path in accordance with light from the carrying path. When the contact sensor is employed in a high-velocity paper carrying device, contact of the sensor with paper causes impact, which makes chattering in an output signal of the contact sensor. Therefore, the light sensor is frequently employed in the paper carrying device because the light sensor has low possibility of chattering.

Examples of the light sensor employed in the paper detection sensor include a reflective light sensor and a transmission light sensor.

The reflective light sensor includes a light emitting section and a light receiving section that are positioned side by side at one side of a carrying path. When paper does not exist at a judgment position in the carrying path, light emitted from the light emitting section is hardly received by the light receiving section (see FIG. 1(*a*)). When paper exists at the judgment position in the carrying path, light emitted from the light emitting section is reflected by the paper and is received by the light receiving section (see FIG. 1(*b*)). Consequently, when the amount of light received by the light receiving section is not less than a predetermined amount, the reflective light sensor outputs a paper-presence-signal. When the amount of light received by the light receiving section is less than the predetermined amount, the reflective light sensor outputs a paper-absence-signal. An example of the reflective light sensor is disclosed in the following Patent Document 1.

The transmission light sensor includes a light emitting section and a light receiving section that are positioned to face each other with a carrying path therebetween. When paper does not exist at a judgment position in the carrying path, light emitted from the light emitting section is received by a light receiving section (see FIG. 2(*a*)). When paper exists at the judgment position in the carrying path, light emitted from the light emitting section is blocked by the paper and therefore the light is hardly received by the light receiving section (see FIG. 2(*b*)). Consequently, when the amount of light received by the light receiving section is not less than a predetermined amount, the reflective light sensor outputs a paper-absence-signal. When the amount of light received by the light receiving section is less than the predetermined amount, the reflective light sensor outputs a paper-presence-signal.

(Patent Document 1)

Japanese Unexamined Patent Publication No. Tokukaihei 7-61651 (published on Mar. 7, 1995).

When a paper carrying device carries a large number of paper continuously, friction between the paper and a guide of a carrying path or friction between the paper and a roller momentarily produces a large amount of paper powders detached from the paper. Consequently, in the paper carrying device having the light sensor, a large amount of paper powders suddenly attach to a light emitting section or a light receiving section of the light sensor.

When the paper powders attach to the light emitting section of the reflective light sensor, light emitted from the light emitting section is reflected irregularly by the paper powders as illustrated in FIG. 1(*c*), and the irregularly reflected light reaches the light receiving section. Consequently, even when paper does not exist at the judgment position in the carrying path, the light receiving section receives the irregularly reflected light and therefore receives not less than a predetermined amount of light, which causes the light receiving section to output a paper-presence-signal erroneously (malfunction of sensor). When the paper powders attach to the light emitting section and/or the light receiving section of the transmission light sensor, light emitted from the light emitting section is blocked by the paper powders as illustrated in FIG. 2(*c*), and light that reaches a light receiving surface of the light receiving section is greatly reduced. Consequently, even when paper does not exist at the judgment position in the carrying path, the amount of light received by the light receiving section is less than the predetermined amount, which causes the light receiving section to output a paper-presence-signal erroneously (malfunction of sensor).

When the light sensor continues to erroneously output the paper-presence-signal for a predetermined time or more, a control section of the paper carrying device erroneously judges that paper jam occurs at the judgment position, and erroneously stops a carrying operation of the paper carrying device.

In a case where the paper carrying device stops erroneously as described above, when the cause of the stop cannot be found, it is difficult to deal with the stop. That is, when it is not found that a large amount of paper powders attach to a light sensor and this causes an error of an output signal of the light sensor, it is difficult to deal with the stop. However, a conventional paper carrying device does not have means for detecting the error correctly.

SUMMARY OF THE INVENTION

An object of the present invention is to provide a paper carrying device capable of detecting with high accuracy an error of an output signal of a light sensor, which error is caused by a large amount of paper powders attaching to the light sensor.

In order to achieve the foregoing object, the paper carrying device of the present invention is a paper carrying device, including: a carrying path via which paper is carried; a light sensor for (i) emitting light to a predetermined position in the carrying path, (ii) receiving light from the predetermined position, and (iii) outputting, in accordance with an amount of the received light, a presence-signal indicating that the paper exists at the predetermined position or an absence-signal indicating that the paper does not exist at the predetermined position; a contact sensor, including a contacting member positioned at the predetermined position, for outputting the presence-signal when the paper contacts the contacting member and outputting the absence-signal when the paper does not contact the contacting member; and a judgment section for judging that a signal output from the light sensor is an error, when the light sensor outputs the presence-signal while the contact sensor outputs the absence-signal.

The following explains why the paper carrying device of the present invention can achieve the foregoing object. Chattering of an output of the contact sensor is a phenomenon that an output signal of the contact sensor momentary becomes a presence-signal although paper does not exist at the predetermined position. That is, an output of the light sensor being not an error and an output of the contact sensor being an error due to chattering results in a state that the light sensor outputs the absence-signal while the contact sensor outputs the presence-signal, and does not results in a state that the light sensor outputs the presence-signal while the contact sensor outputs the absence-signal. On the other hand, when a large amount of paper powders attach to the light sensor, the light sensor cannot emit/receive light normally, and consequently the light sensor erroneously outputs the presence-signal although the paper does not exist at the predetermined position. However, the contact sensor is not designed to detect presence/absence of paper in accordance with emission/reception of light and therefore even if a large amount of paper powders attach to the contact sensor, the contact sensor can correctly output the absence-signal when paper does not exist at the predetermined position. Accordingly, when the light sensor outputs the presence-signal while the contact sensor outputs the absence-signal, it is considered that this discrepancy is not derived from an error in an output of the contact sensor due to the chattering, but derived from an error in an output of the light sensor due to a large amount of paper powders attaching to the light sensor. Therefore, with the paper carrying device including a judgment section for judging that a signal output from the light sensor is an error when the light sensor outputs the presence-signal while the contact sensor outputs the absence-signal, it is possible to detect with high accuracy an error in an output signal of the light sensor which error is caused by a large amount of paper powders attaching to the light sensor.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1(*b*) is a drawing illustrating a state where the reflective light sensor receives light reflected from paper. FIG. 1(*c*) is a drawing illustrating a state where paper powders attach to the reflective light sensor.

FIG. 2(*b*) is a drawing illustrating a state where the transmission light sensor receives light having passed through paper. FIG. 2(*c*) is a drawing illustrating a state where paper powders attach to the transmission light sensor.

FIG. 5(*b*) is a side drawing illustrating a light sensor and a contact sensor. FIG. 5(*c*) is a side drawing illustrating a light sensor, a contact sensor, and a carried document.

FIG. 7(*b*) is a drawing illustrating waveforms of output signals of a light sensor and a contact sensor in an abnormal state. FIG. 7(*c*) is a drawing illustrating a waveform of a smoothed output signal of a contact sensor.

DESCRIPTION OF THE EMBODIMENTS

[Printing Apparatus]

Figure 1:
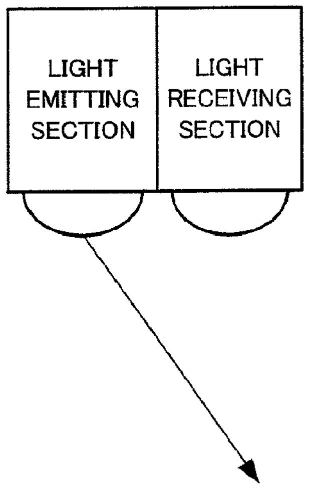
FIG. 1(*a*) is a drawing illustrating a reflective light sensor.
Figure 1:
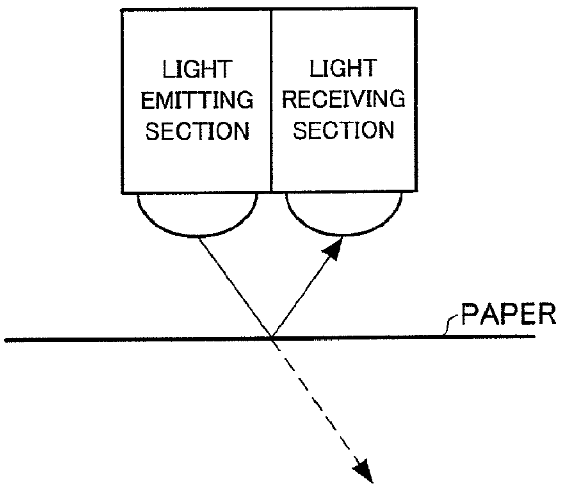
Figure 1:
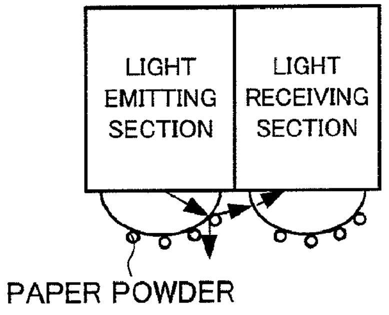
Figure 2:
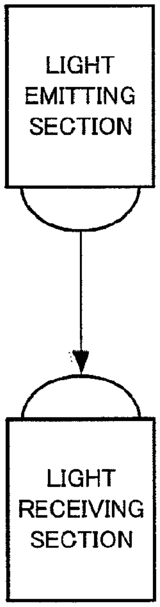
FIG. 2(*a*) is a drawing illustrating a transmission light sensor.
Figure 2:
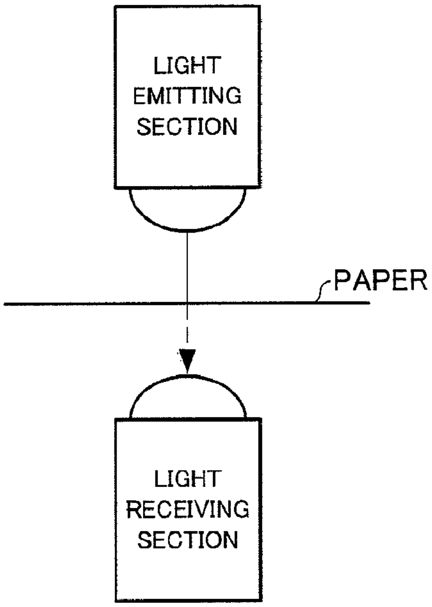
Figure 2:
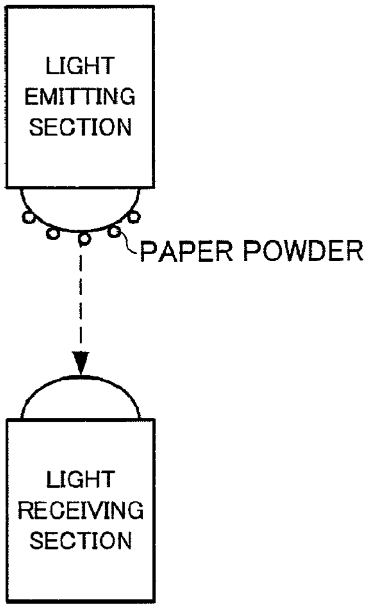
Figure 3:
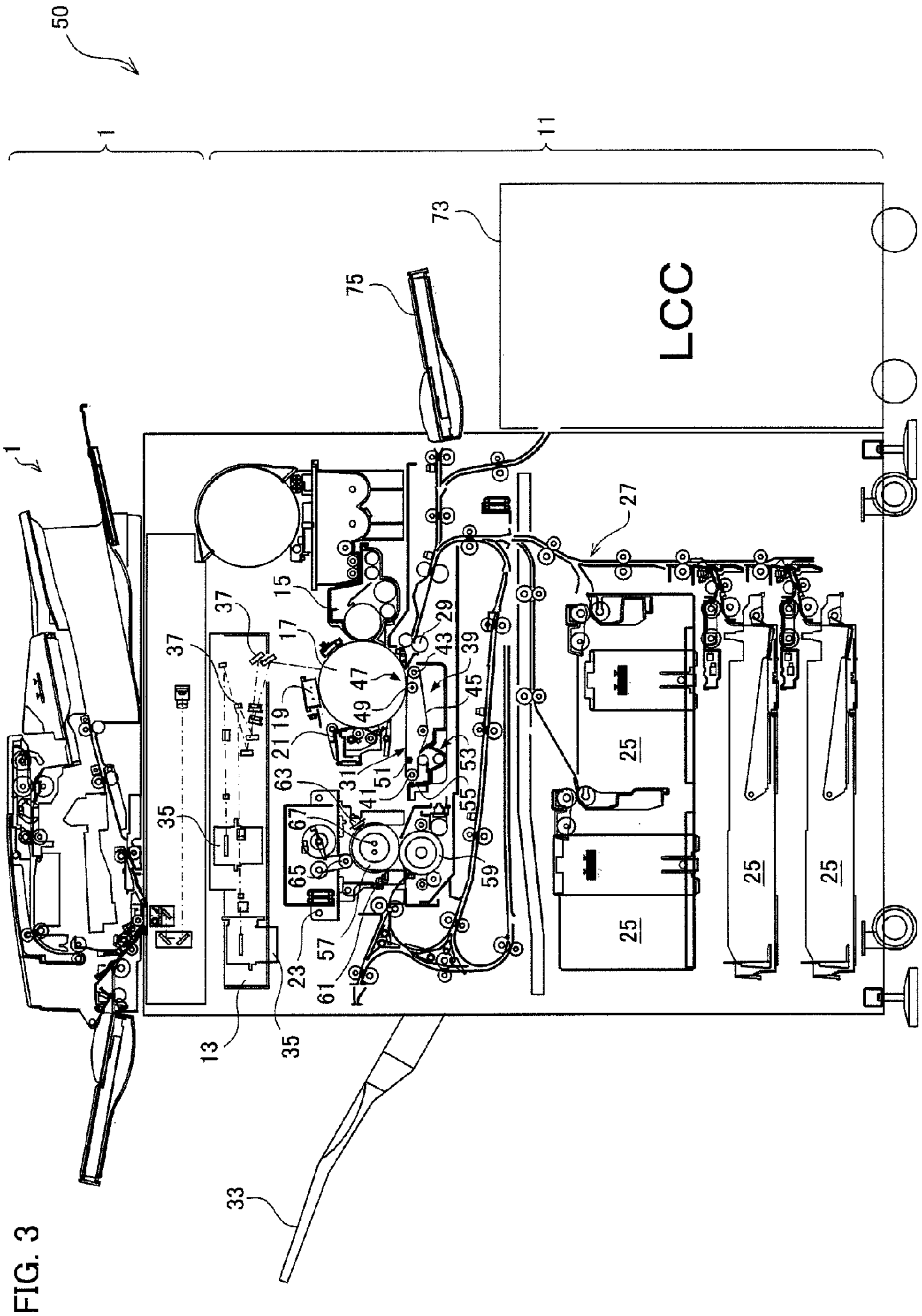
FIG. 3 is a drawing illustrating a multi-function printer including a document scanning apparatus of the present embodiment and a printing section of the present embodiment.

The following explains an embodiment of a printing apparatus (image forming apparatus) of the present invention with reference to FIG. 3. FIG. 3 is a drawing illustrating a multi-function printer 50 including a printing section 11 that is an embodiment of the printing apparatus of the present invention.

The printing section 11 is an electrophotographic printer that forms a monochrome image (monochrome and black image) on paper in accordance with digital image data received from an external apparatus or a document scanning apparatus 1 provided above the printing section 11.

As illustrated in FIG. 3, the printing section 11 includes an exposure device 13, a developer 15, a photoreceptor drum 17, a charger 19, a cleaner unit 21, a fixing unit 23, a paper feeding tray 25, a registration roller 29, a paper feeding path 27, a paper carrying path 31, a paper output tray 33 etc. The paper feeding path 27 is a path formed at a region ranging from the paper feeding tray 25 to a region where the registration roller 29 is provided. The paper carrying path 31 is a path formed at a region ranging from the region where the registration roller 29 is provided to the paper output tray 33 via an image transfer area 47 and the fixing unit 23.

The charger 19 is charging means for evenly charging outer surface of the photoreceptor drum 17 so that the outer surface has a predetermined electric potential. In the printing section 11 in FIG. 3, the charger 19 is of a charger type. Alternatively, a roller-type charger or a brush-type charger that contact the photoreceptor drum 17 may be used.

The exposure device 13 is a laser scanning unit (LSU) including a laser emitting section 35 and a reflection mirror 37. In accordance with input image data, the exposure device 13 exposes an outer surface of the photoreceptor drum 17 that has been evenly charged by the charger 19, so as to form an electrostatic latent image corresponding to the input image data on the outer surface of the photoreceptor drum 17. In the present embodiment, the exposure device 13 is a laser scanning unit employing a two-beam system in order to prevent a laser light source from having a too high emitting velocity in high-velocity printing. The exposure device 13 is not limited to a laser scanning unit and may be a unit in which light emitting elements such as EL (electroluminescence) and LED (light emitting diode) are arrayed.

The developer 15 supplies a toner to the electrostatic latent image formed on the outer surface of the photoreceptor drum 17 so as to develop (visualize) the electrostatic latent image. The cleaner unit 21 removes or collects a toner remaining on the outer surface of the photoreceptor drum 17 after the development and the image transfer.

The toner image (image) visualized on the outer surface of the photoreceptor drum (photoreceptive material) 17 is transferred onto paper at the image transfer area 47. An electric field whose polarity is opposite to that of an electric charge borne on the toner remaining on the outer surface of the photoreceptor drum 17 is applied on a transfer mechanism 39 for transferring an image. The electric field allows the toner remaining on the outer surface of the photoreceptor drum 17 to be transferred onto the paper. For example, in a case where the toner on the outer surface of the photoreceptor drum 17 bears an electric charge with negative polarity, an electric field with positive polarity is applied on the transfer mechanism 39.

The transfer mechanism 39 includes a driving roller 41, a driven roller 43, an elastic conductive roller 49, other rollers, and a transfer belt 45 suspended by these rollers.

The transfer belt 45 is a belt member whose volume resistance ranges from $1\times10^{9}\Omega\cdot$cm to $1\times10^{13}\Omega\cdot$cm. Further, the elastic conductive roller 49 for applying a transfer electric field is provided near the image transfer area 47 that is an area where the photoreceptor drum 17 contacts the transfer belt 45.

The elastic conductive roller 49 presses the transfer belt 45 and the photoreceptor drum 17 so that the transfer belt 45 is pressed to the photoreceptor drum 17. Consequently, the image transfer area 47 (transfer nip area) where the photoreceptor drum 17 contacts the transfer belt 45 does not have a linear shape but has a plane shape with a predetermined width. This allows increasing efficiency in transferring an image onto carried paper.

Further, at a downstream of the image transfer area 47 in a paper carrying direction, there is provided a charge removing roller 51 for removing an electric charge from paper having been charged when passing the image transfer area 47 and for smoothly carrying the paper to the fixing unit 23. The charge removing roller 51 is provided at the back of the transfer belt 45.

Further, the transfer mechanism 39 is provided with a cleaning unit 53 for removing toner scumming on the transfer belt 45 and a charge removing mechanism 55 for removing an electric charge from the transfer belt 45. Examples of how the charge removing mechanism 55 removes an electric charge include: grounding the transfer belt 45 via a device; and applying on the transfer belt 45 an electric field whose polarity is opposite to that of the transfer electric field. The paper on which the toner image (image) has been transferred by the transfer mechanism 39 is carried to the fixing unit 23.

The fixing unit 23 includes a heat roller 57 and a pressure roller 59. Around the heat roller 57, there are provided a paper peeling claw 61, a thermistor 63 (roller surface temperature detection member), and a roller surface cleaning member 65. Further, inside the heat roller 57, there is provided a heat source 67 for heating an outer surface of the heat roller 57 at a predetermined temperature (preset fixing temperature: approximately 160-200° C.).

The pressure roller 59 is provided with a mechanism such as a loaded spring at both ends of the pressure roller 59 in an axial direction. This mechanism causes the pressure roller 59 to be pressed to the heat roller 57 with a predetermined load. Further, as with the case of the heat roller 57, around the pressure roller 59, there are provided a paper peeling claw and a roller surface cleaning member.

The fixing unit 23 is designed so that, in a fixing area where the pressure roller 59 presses the heat roller 57, an unfixed toner image on paper is thermally fixed to the paper due to a temperature on the surface of the heat roller 57 and pressure of the pressure roller 59.

The paper feeding tray 25 is a tray in which paper for printing (printing paper) is stored. In the printing section 11 of the present embodiment, the paper feeding tray 25 is provided below an image forming section including the photoreceptor drum 17, the transfer mechanism 39 etc. In the printing section 11 of the present embodiment, there are provided a plurality of the paper feeding trays 25 each capable of storing 500-1500 sheets of paper with a predetermined size in order to allow continuous printing of a very large number of paper. Further, at the side of the apparatus, there are provided a large capacity paper feeding cassette 73 capable of storing a large number of different kinds of paper and a manual tray 75 mainly used when printing paper with an undetermined size.

The paper output tray 33 is provided at the side of the apparatus in such a manner as to be opposite to the manual tray 75. It is possible to optionally provide, instead of the paper feeding tray 33, a post-process apparatus for performing a post-process on output paper (such process as stapling and punching) and a multi-stage paper output tray.

Further, the printing section 11 is provided with a printing control section for controlling an operation of the printing section 11. The printing control section includes, for example, a microcomputer; a ROM (Read Only Memory) in which a control program indicative of a procedure for the microcomputer to execute processes is stored; a RAM (Random Access Memory) for providing a work area; a non-volatile memory in which data necessary for control is backed up and stored; an input circuit that is for receiving a signal from a sensor and a switch and that includes an input buffer and an A/D conversion circuit; and an output circuit that includes a driver for driving a motor and a solenoid or a lamp etc.

The following details carriage of paper in the printing section 11. First, the printing control section selects the paper feeding tray 25 in which paper to be carried is stored, and controls operations of rollers provided along the paper feeding path 27, thereby carrying the paper stored in the selected paper feeding tray 25 to the registration roller 29. Thus, the paper reaches right before the registration roller 29 and stops there temporarily.

Next, the printing control section causes the registration roller 29 to rotate again with timing that allows a front end of the paper and a front end of an image on the outer surface of the photoreceptor drum 17 to overlap, thereby carrying the paper to the image transfer area 47. The transfer mechanism 39 transfers an image (toner image) to the paper and thereafter the paper is carried to the fixing unit 23, the toner image transferred to the paper is fixed to the paper, and the paper is output to the paper output tray 33.

Further, the printing control section switches carrying paths from the fixing unit 23 to the paper output tray 33 in accordance with a printing mode (copier mode, printer mode, or FAX mode) and a printing method (one-side printing/two-side printing).

Normally, in the copier mode, a user operates the apparatus near the apparatus, and therefore it is frequent that paper is output with its face up. This is referred to as "face-up output." On the other hand, in the printing mode and the FAX mode, the user does not exist near the apparatus, and therefore it is frequent that "face-down output" is performed in which the order of pages of output paper is arranged. The printing section 11 includes a mechanism for switching between the face-up output and the face-down output in accordance with a printing mode. The switching mechanism includes a plurality of carrying paths and a plurality of diverging claws that are provided between the fixing unit 23 and the paper output tray 33, and allows a paper output according to a printing mode.

[Document Scanning Apparatus]

Figure 4:
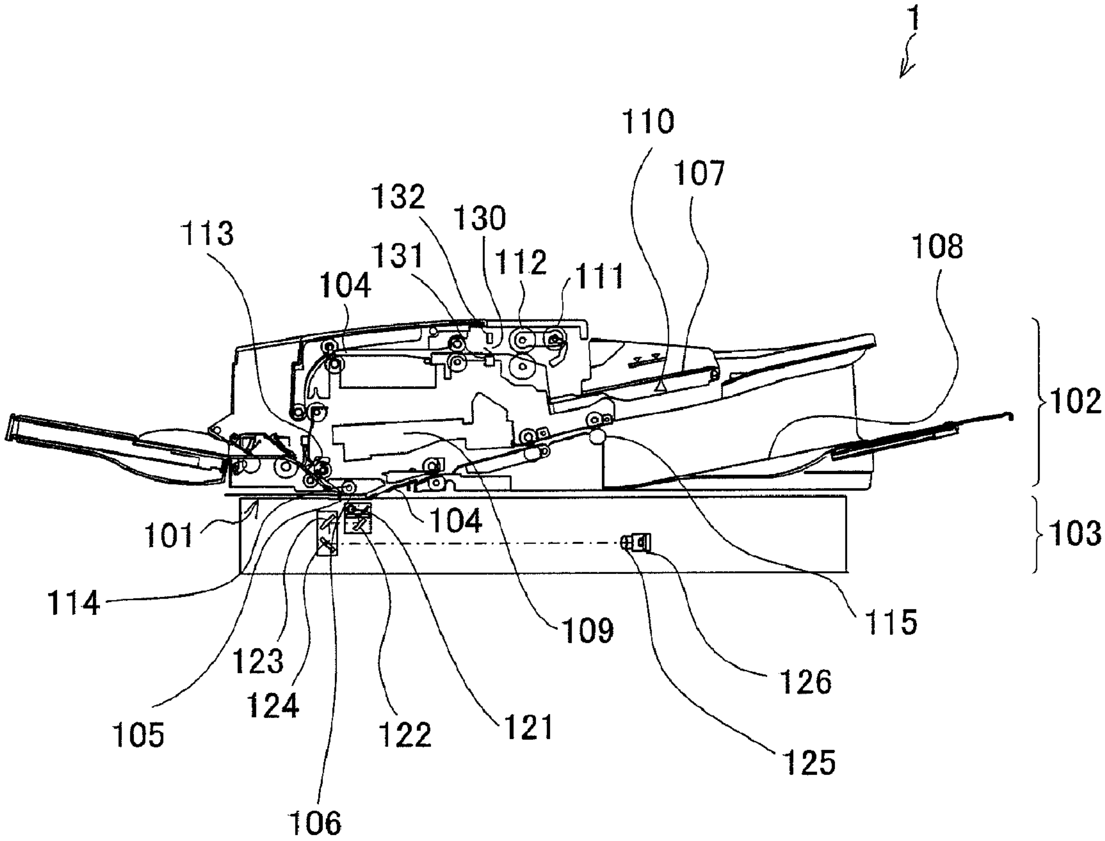
FIG. 4 is a drawing illustrating a document scanning apparatus of the present embodiment.

An explanation is made as to an embodiment of a document scanning apparatus (paper carrying device) of the present invention with reference to drawings. FIG. 4 is a drawing for illustrating a whole arrangement of the document scanning apparatus 1 of the present embodiment. The document scanning apparatus 1 is provided above the printing section 11 in the multi-function printer 50, and is a scanner with a system for reading an image from a document (paper, sheet) in carriage (document carrying system).

As illustrated in FIG. 4, the document scanning apparatus 1 includes a transparent plate 101 made of glass, an automatic document carrying device 102 provided at the side of one plane of the transparent plate 101 (provided above the transparent plate 101), and a scanner optical system 103 provided at the side of the other plane of the transparent plate 101 (provided below the transparent plate 101).

The automatic document carrying device 102 includes a carrying path 104. The carrying path 104 includes a reading window 105. The carrying path 104 is designed in such a manner that a document at a predetermined reading position 106 in the carrying path 104 faces the scanner optical system 103 via the reading window 105 and the transparent plate 101. The scanner optical system 103 is image reading means for reading an image of a document that passes the reading position 106 and outputting digital image data indicative of the image.

Next, an explanation is made as to members included in the automatic document carrying device 102. The automatic document carrying device 102 includes: a paper feeding tray 107 on which a document before being subjected to image reading by the scanner optical system 103 is placed; a paper output tray 108 on which a document after being subjected to image reading by the scanner optical system 103 is placed; and the carrying path 104. The carrying path 104 extends from the paper feeding tray 107 to the paper output tray 108 via the reading position 106. That is, a document placed on the paper feeding tray 107 is carried via the reading position 106 and is output to the paper output tray 108.

Further, the automatic document carrying device 102 is provided with a pickup roller 111, a handling roller 112, a pair of registration rollers 113, a platen roller 114, and a pair of paper output rollers 115, which are arrayed along the carrying path 104 in this order from the side of the paper feeding tray 107 (from the upstream side in a carrying direction). The reading window 105 and the reading position 106 are provided so as to be at the downstream of the pair of the registration rollers 113 and at the upstream of the pair of the paper output rollers 115 and to face the platen roller 114.

Next, an explanation is made as to members included in the scanner optical system 103. The scanner optical system 103 includes a light source 121, a first mirror 122, a second mirror 123, a third mirror 124, a converging lens 125, and a line sensor 126.

The light source 121 exposes, via the transparent plate 101 and the reading window 105, a document passing the reading position 106. When the document passing the reading position 106 is exposed, light is reflected from the document. The light reflected from the document passes the reading window 105 and the transparent plate 101 and is reflected by the first mirror 122, the second mirror 123, and the third mirror 124 in this order, and passes the converging lens 125 and is led to the line sensor 126. The line sensor 126 is a photoelectric conversion device (CCD: Charge Coupled Device) for receiving the light reflected from the document, converting the light into an electric signal, and outputting the electric signal.

The electric signal output from the line sensor 126 is converted into digital image data by an A/D converter (Analog to Digital converter) (not shown). The converted digital image data is subjected to an image process by an image process section 140 in FIG. 6, and thereafter transmitted to the printing section 11 or an external apparatus via an output interface 141 in FIG. 6.

Next, an explanation is made as to a document carrying operation and an image reading operation by the automatic document carrying device 102. The pickup roller 111 and the handling roller 112 send a document one by one from the paper feeding tray 107 to the carrying path 104, and the document passes a judgment position 130 in FIG. 4 and is temporarily stopped in such a manner that the document touches the pair of the registration rollers 113. In accordance with timing to send the document to the reading position 106, the pair of the registration rollers 113 are driven so as to carry the document to the reading position 106. Further, at the reading position 106, the document is carried while being pressed to the transparent plate 101 by the platen roller 114. The scanner optical system 103 exposes, from the lower side of the transparent plate 101, the document pressed to the transparent plate 101 at the reading position 106, and causes a reflected light image from the document (reflected light image having passed the transparent plate 101) to be incident to the line sensor 126, thereby reading an image. Thereafter, the document is output to the paper output tray 108 by the pair of the paper output rollers 115.

Although not shown in FIG. 4, the document scanning apparatus 1 in FIG. 4 includes, in a space 109, a scanner optical system other than the scanner optical system 103. The scanner optical system in the space 109 reads an image of the document at the reading position 106 from the upper side of the transparent plate 101.

Figure 6:
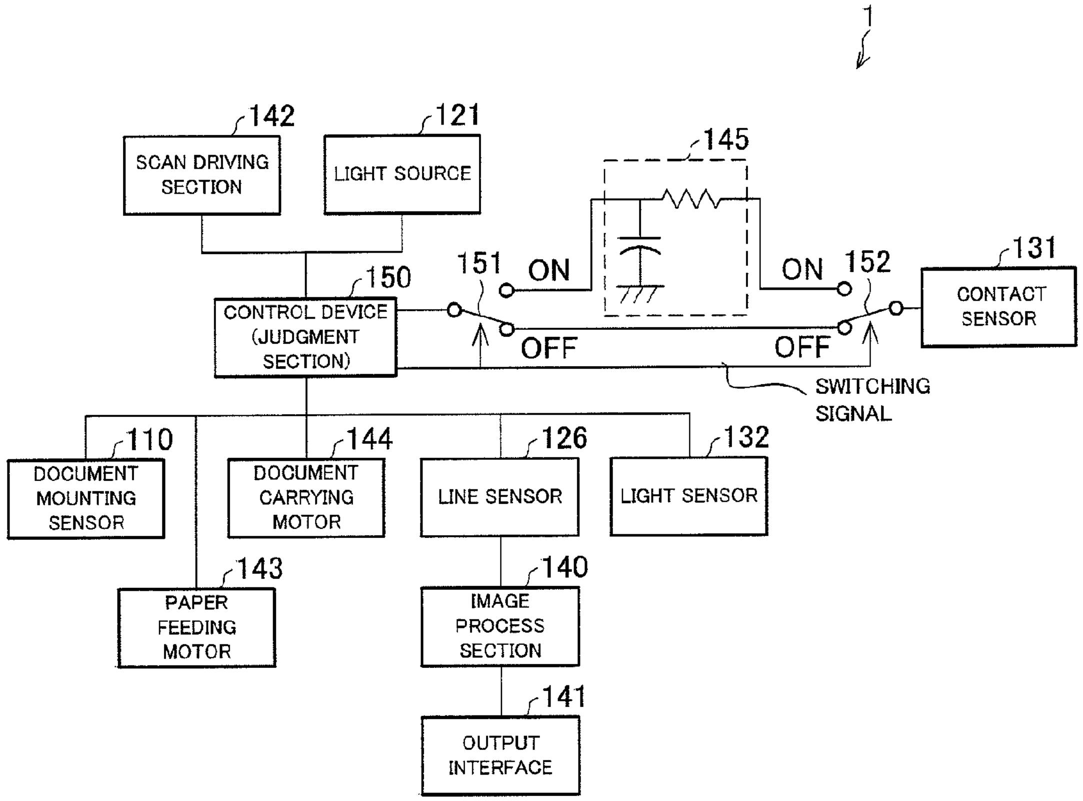
FIG. 6 is a block diagram illustrating individual hardware included in a document scanning apparatus of the present embodiment.

Next, an explanation is made as to a control device for controlling the document scanning apparatus 1, a peripheral circuit (sensor, driving circuit, etc.) of the control device, and a peripheral device (such as motor) of the control device. FIG. 6 is a block diagram illustrating connections of individual hardware in the document scanning apparatus 1.

As illustrated in FIG. 6, the document scanning apparatus 1 includes a scan driving section 142, a paper feeding motor 143, a document carrying motor 144, a document mounting sensor 110, a light sensor 132, a contact sensor 131, a smoothing circuit (smoothing process section) 145, a control device judgment section, carriage control section) 150, and switches 151 and 152, in addition to the light source 121 and the line sensor 126.

Each of the light source 121, the line sensor 126, the scan driving section 142, the paper feeding motor 143, the document carrying motor 144, the document mounting sensor 110, and the light sensor 132 is connected with the control device 150.

When the switches 151 and 152 switch to an off-state in response to a switching signal from the control device 150, the switches 151 and 152 disconnect an output terminal of the contact sensor 131 from an input terminal of the smoothing circuit 145, disconnect an output terminal of the smoothing circuit 145 from an input terminal of the control device 150, and connect an output terminal of the contact sensor 131 with an input terminal of the control device 150.

On the other hand, when the switches 151 and 152 switch to an on-state in response to a switching signal from the control device 150, the switches 151 and 152 disconnect the output terminal of the contact sensor 131 from the input terminal of the smoothing circuit 150, connect the output terminal of the contact sensor 131 from the input terminal of the smoothing circuit 145, and connect the output terminal of the smoothing circuit 145 with the input terminal of the control device 150.

That is, when the switches 151 and 152 are in the off-state, a signal output from the contact sensor 131 is directly input to the control device 150. When the switches 151 and 152 are in the on-state, a signal output from the contact sensor 131 is smoothed by the smoothing circuit 145 and is input to the control device 150.

The scan driving section 142 is a driver circuit for driving a unit including the light source 121 and the first mirror 122 in FIG. 4. That is, the control device 150 controls the unit by sending a driving signal to the scan driving section 142.

The paper feeding motor 143 is a motor for driving the pickup roller 111. That is, the control device 150 drives the pickup roller 111 by driving the paper feeding motor 143, thereby sending a document to the carrying path 104.

The document carrying motor 144 is a motor for driving each of a plural pairs of carrying rollers provided along the carrying path 104. That is, the control device 150 drives the pairs of the carrying rollers by driving the document carrying motor 144, thereby carrying a document in the carrying path 104.

As illustrated in FIG. 4, the document mounting sensor 110 is included in the paper feeding tray 107. When a document is mounted on the paper feeding tray 107, the document mounting sensor 110 transmits, to the control device 150, a mounting signal indicating that the document is mounted on the paper feeding tray 107. When a document is not mounted on the paper feeding tray 107, the document mounting sensor 110 transmits, to the control device 150, a non-mounting signal indicating that the document is not mounted on the paper feeding tray 107.

As illustrated in FIG. 4, the contact sensor 131 and the light sensor 132 are provided at the downstream of the handling roller 112 and at the upstream of the pair of the registration rollers 113 in such a manner as to face each other with the carrying path 104 therebetween. In the present embodiment, a region sandwiched by the contact sensor 131 and the light sensor 132 in the carrying path 104 is regarded as the judgment position 130.

Figure 5:
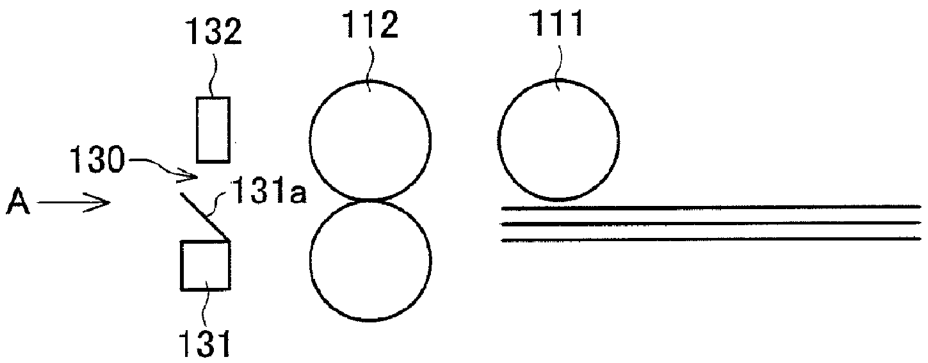
FIG. 5(*a*) is an elevation drawing illustrating a light sensor and a contact sensor.
Figure 5:
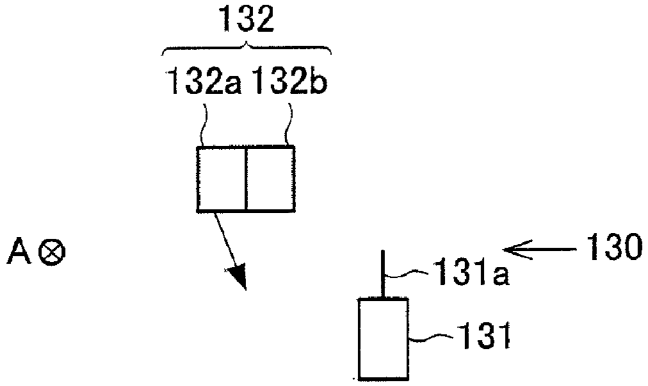
Figure 5:
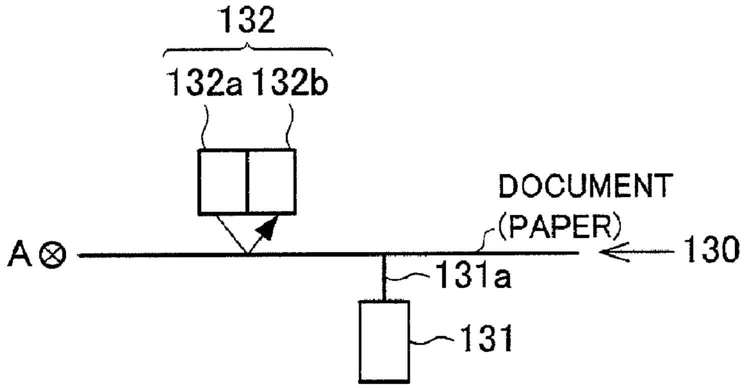

An explanation is made below as to the contact sensor 131 with reference to FIG. 5. As illustrated in FIG. 5(*a*), the contact sensor (actuator) 131 is provided with a protruding member 131*a*. As illustrated in FIG. 5(*b*), when a document does not exist at the judgment position 130, the protruding member 131*a* protrudes to the judgment position 130. On the other hand, as illustrated in FIG. 5(*c*), when a document (paper) exists at the judgment position 130, the protruding member 131*a* touches the document and consequently is pushed into the contact sensor 131. When the protruding member 131*a* does not touch a document and protrudes to the judgment position 130, the contact sensor 131 outputs a High signal (document-absence-signal) indicating that a document does not exist at the judgment position 130. When the protruding member 131 touches a document and is pushed into the contact sensor 131, the contact sensor 131 outputs a Low signal (document-presence-signal) indicating that the document exists at the judgment position 130.

Next, an explanation is made as to the light sensor 132 with reference to FIG. 5. The light sensor 132 of the present embodiment is a reflective light sensor. As illustrated in FIGS. 5(*a*) to 5(*c*), the light sensor 132 includes a light emitting section 132*a* and a light receiving section 132*b* that are arrayed side by side at one side (upper side) of the carrying path 104. The light emitting section 132*a* is a light emitting diode (LED) and the light receiving section 132*b* is a photodiode.

As illustrated in FIG. 5(*b*), when a document does not exist at the judgment position 130, light emitted from the light emitting section 132*a* is hardly received by the light receiving section 132*b*. In contrast thereto, as illustrated in FIG. 5(*c*), when a document (paper) exists at the judgment position 130, most of light emitted from the light emitting section 132*a* is reflected by the document and is received by the light receiving section 132*b*. When the amount of received light is not less than a predetermined amount, the light receiving section 132*b* of the light sensor 132 outputs a Low signal (document-presence-signal) indicating that the document exists at the judgment position 130. When the amount of received light is less than the predetermined amount, the light receiving section 132*b* outputs a High signal (document-absence-signal) indicating that the document does not exist at the judgment position 130.

The following details a waveform of a signal output from the light sensor 132 and a waveform of a signal output from the contact sensor 131.

In a case where there is no abnormality in the light sensor 132 and the contact sensor 131, both of the light sensor 132 and the contact sensor 131 output a High signal when a document does not exist at the judgment position 130 and output a Low signal when the document exists at the judgment position 130. That is, as illustrated in FIG. 7(*a*), outputs of the light sensor 132 and the contact sensor 131 change from High to Low with timing when a front end of a document (front end in a carrying direction) passes the judgment position 130, and the outputs change from Low to High with timing when a rear end (rear end in a carrying direction) passes the judgment position 130.

Figure 7:
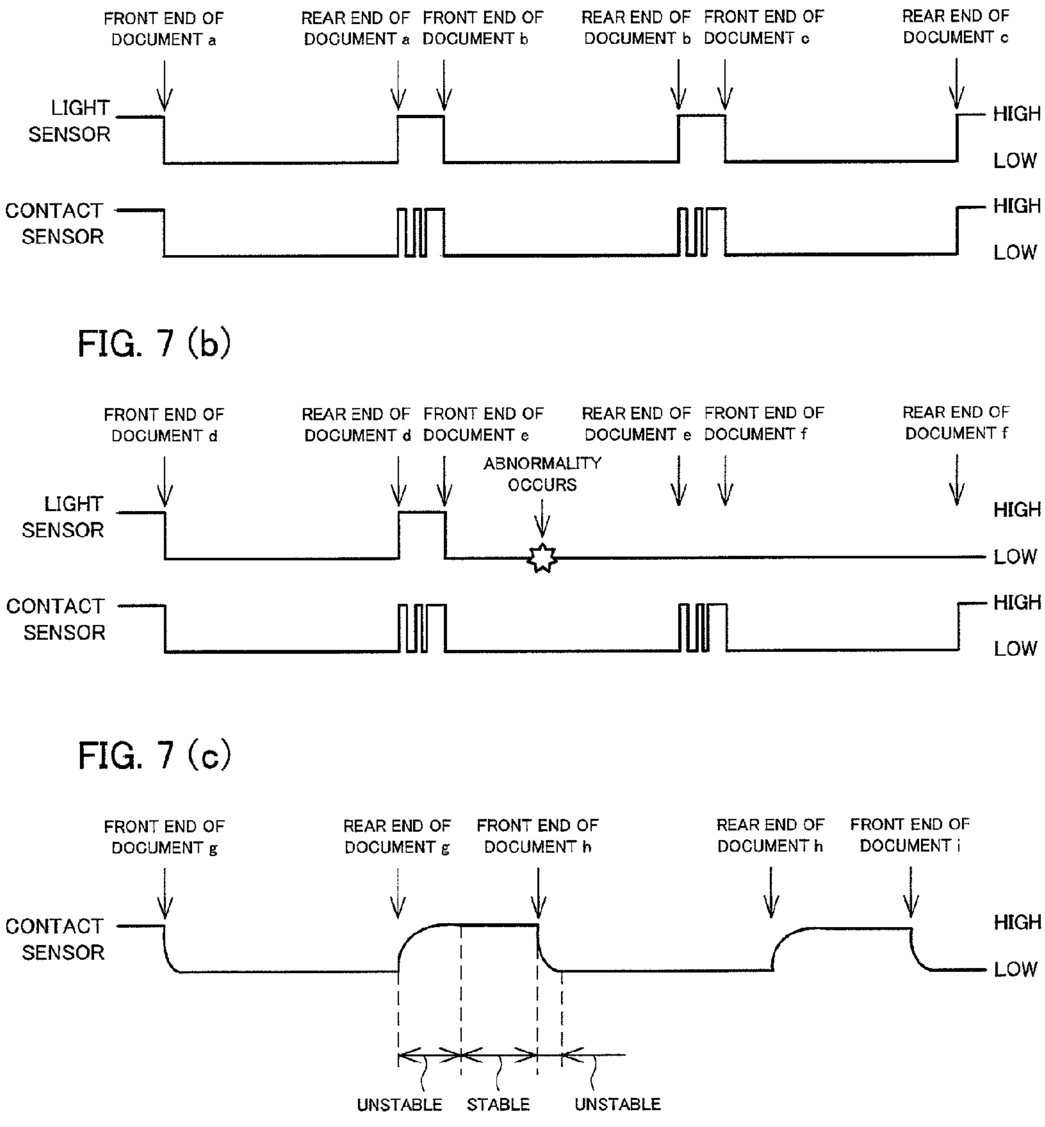
FIG. 7(*a*) is a drawing illustrating waveforms of output signals of a light sensor and a contact sensor in a normal state.

As illustrated in FIG. 7(*a*), the output of the contact sensor 131 shows chattering for a very shot time after changing from Low to High with timing when a rear end of a document passes the judgment section 130. This chattering is caused due to vibration of the protruding member 131*a*, and the vibration is caused when the rear end of the document passes the judgment section 130.

Further, as illustrated in FIG. 7(*b*), in a case of abnormality that a large amount of paper powders suddenly attach to the light emitting section 132*a* of the light sensor 132 after a front end of a document e passes the judgment position 130, the light sensor 132 continues to output a Low signal even after a rear end of the document e has passed the judgment position 130, which means that the light sensor 132 outputs an incorrect signal. This is because when the paper powders attach to the light emitting section 132*a* of the light sensor 132, light emitted from the light emitting section 132*a* is irregularly reflected and is received by the light receiving section 132*b* and consequently the light receiving section 132*b* receives a large amount of light even if a document does not exist at the judgment position 130, and as a result the light receiving section 132*b* outputs a Low signal.

In contrast thereto, as illustrated in FIG. 7(*b*), even in a case of abnormality that a large amount of paper powders attach to the contact sensor 131, the contact sensor 131 outputs a Low signal when the document e exists at the judgment position 130, and outputs a High signal when the document e does not exist at the judgment position 130, thereby outputting a correct signal.

Next, an explanation is made as to the control device 150 in FIG. 6. The control device 150 totally controls the sensors, the motors, and the switches etc. in FIG. 6 so as to realize a document carrying process in the document scanning apparatus 1. The control device 150 includes (a) a microcomputer, (b) a ROM or a hard disc in which a control program indicative of a procedure for data processing carried out by the microcomputer, (c) a RAM where data is developed in data processing, (d) a non-volatile memory in which data is stored, (c) an input buffer for receiving a signal from peripheral equipment and an input circuit including an A/D conversion circuit for digitalizing the signal, etc., and (f) an output circuit for outputting a signal to peripheral equipment, and the like.

Figure 8:
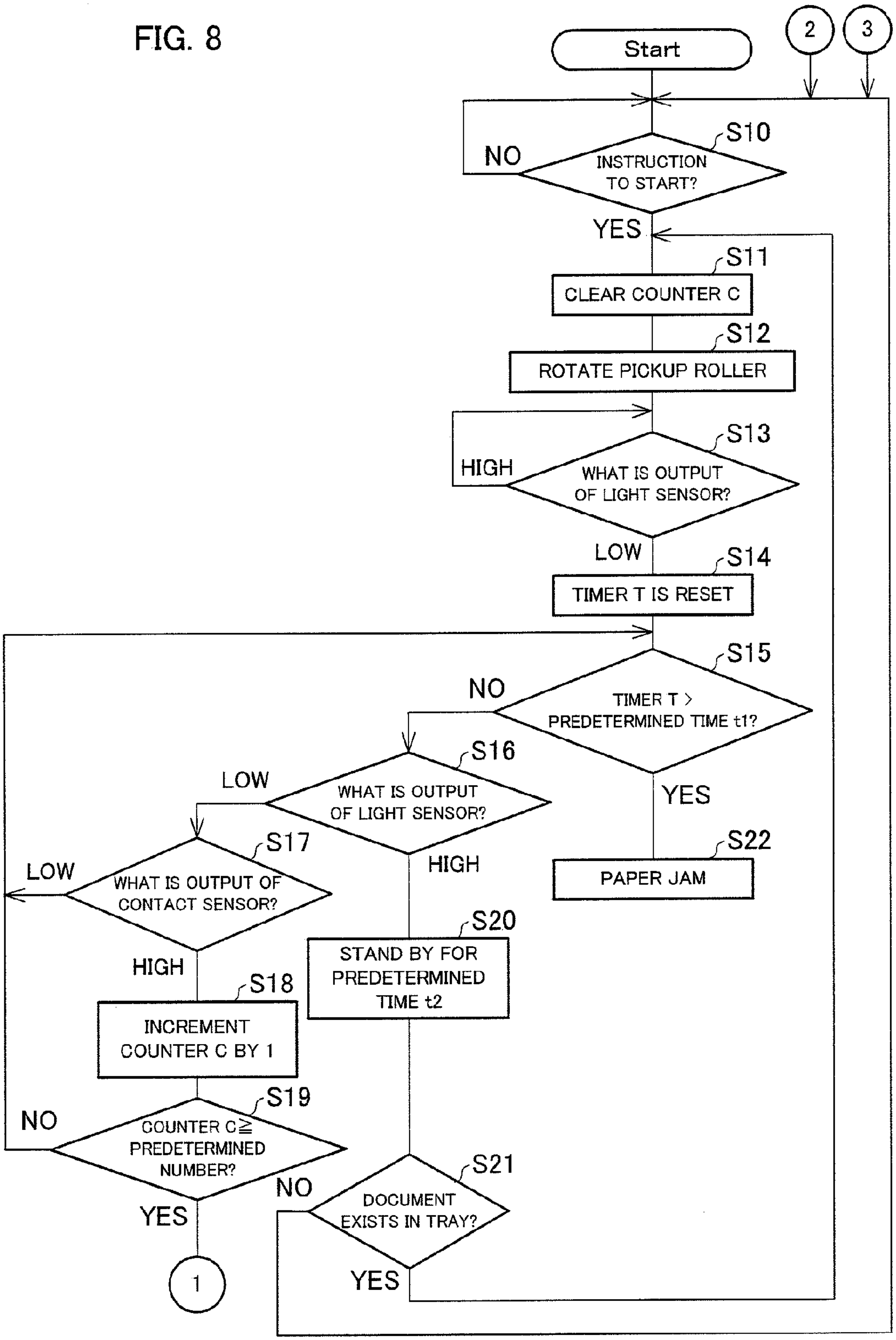
FIG. 8 is a first flowchart illustrating procedures of a control device included in a document scanning apparatus of the present embodiment.
Figure 9:
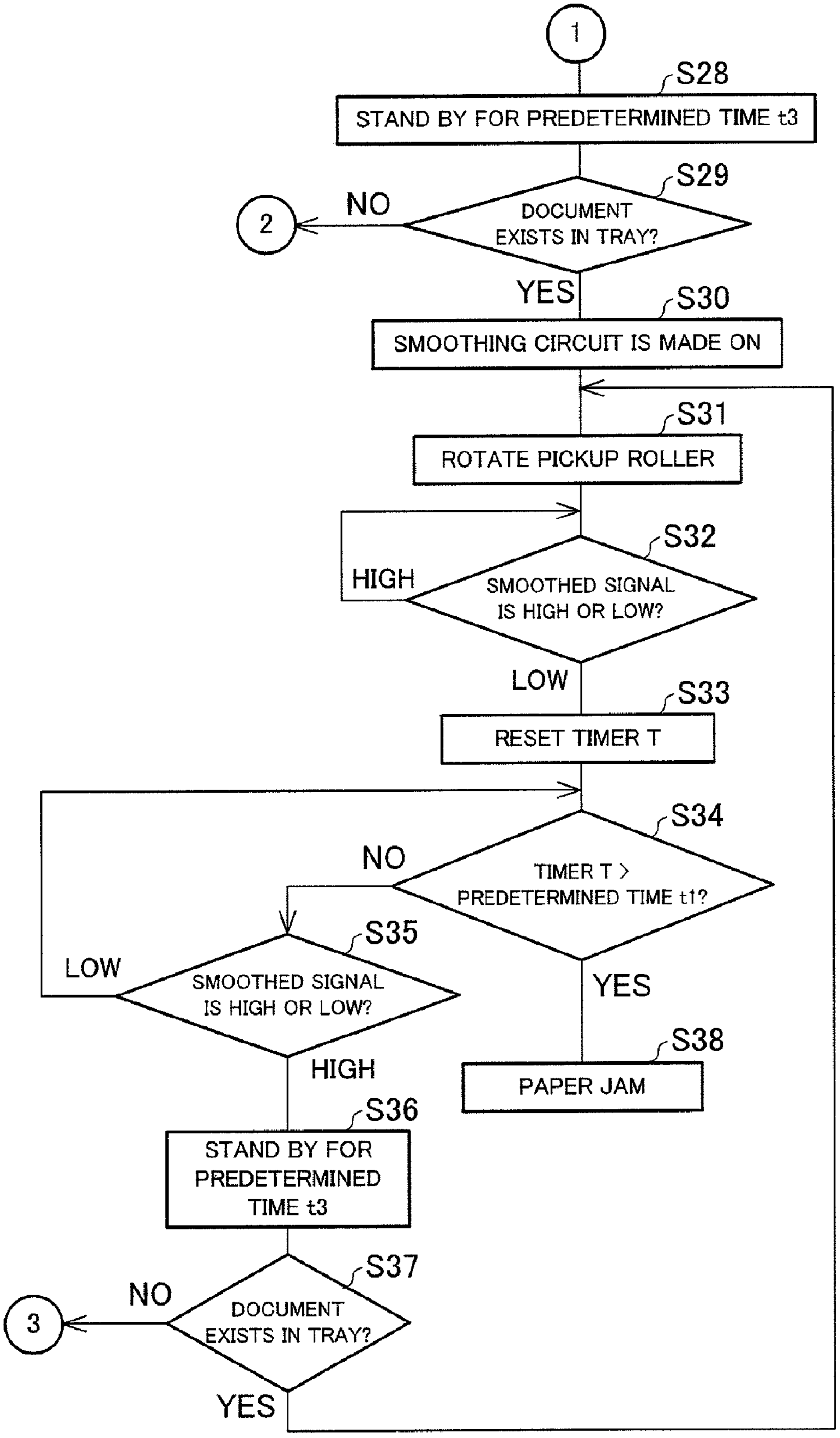
FIG. 9 is a second flowchart illustrating procedures of a control device included in a document scanning apparatus of the present embodiment.

The following details a control by the control device 150 with reference to flowcharts in FIGS. 8 and 9. As shown in S10 in FIG. 8, the control device 150 stands by while waiting for receiving an instruction to start a document carrying job. The instruction to start a document carrying job is entered by a user pressing a start button.

When receiving the instruction to start a document carrying job (YES in S10), the control device 150 clears a counter C for counting the number of errors (S11). Further, at the same time as S11, the control device 150 outputs a switching signal so as to cause the switches 151 and 152 to be in an off-state, so that a signal output from the contact sensor 131 is input to the control device 150 without via the smoothing circuit 145.

Next, the control device 150 drives the paper feeding motor 143 so as to rotate the pickup roller 111 for a predetermined time (1-2 seconds) (S12), thereby sending a document α in the paper feeding tray 107 to the carrying path 104. Thus, the document α (one sheet of a document) is carried from the paper feeding tray 107 to the judgment position 130 in the carrying path 104.

After S12, the control device 150 monitors an output of the light sensor 132 and judges whether the output is High or Low (S13). When it is judged in S13 that the output of the light sensor 132 is High (no detection of falling edge), a front end of the document α have not yet passed the judgment position 130, and therefore S13 is repeated. In contrast thereto, when it is judged in S13 that the output of the light sensor 132 is Low (detection of falling edge), a front end of the document α have passed the judgment position 130, and therefore the control device 150 causes the process to go to S14.

In S14, the control device 150 resets a timer T and causes the timer T to start counting a time. Thereafter, the control device 150 judges in S15 whether the time counted by the timer T exceeds a predetermined time t1 or not. When the time counted by the timer T does not exceed the predetermined time t1 (NO in S15), the control device 150 performs a process for judging whether the output of the light sensor 132 is High or Low (S16, first process). The output of the light sensor 132 being High in S16 indicates that a rear end of the document α has passed the judgment position 130. The output of the light sensor 132 being Low in S16 indicates that a front end of the document α has passed the judgment position 130 but the rear end of the document α has not yet passed the judgment position 130.

When it is judged in S16 that the output of the light sensor 132 is High, the control device 150 stands by for a predetermined time t2 (S20). After S20, the control device 150 judges whether a document β (document to be carried next to the document α) exists or not on the paper feeding tray 107, in accordance with a signal from the document mounting sensor 110 (S21). When judging in S21 that the document β exists on the paper feeding tray 107 (YES in S21), the control device 150 causes the process to go to S11 in order to carry the document β, and repeats S11 and subsequent steps. The reason why the control device 150 stands by for the predetermined time t2 in S20 is to secure a predetermined length between paper and subsequent paper (distance between currently carried document α and currently carried document β.

When Judging in S21 that a document does not exist on the paper feeding tray 107 (NO in S21), the control device 150 finishes the present document carrying job, and causes the process to go to S10 in order to wait for an instruction to start a next document carrying job.

When judging in S16 that the output of the light sensor 132 is Low, the control device 150 performs a process for judging whether the output of the contact sensor 131 is High or Low (S17, second process).

When judging in S17 that the output of the contact sensor 131 is Low, the control device 150 causes the process to go to S15 and repeats S15 and subsequent steps until the predetermined time t1 elapses. In contrast thereto, when judging in S17 that the output of the contact sensor 131 is High, the control device 150 increments the counter C by 1 (S18), and judges whether the number counted by the counter C is not less than a predetermined number (S19). Further, when judging that the number counted by the counter C is not less than the predetermined number (YES in S19), the control device 150 judges that the output signal of the light sensor 132 is an error and goes to a process flow without the output signal of the light sensor 132 (FIG. 9). Further, when judging that the number counted by the counter C is less than the predetermined number (NO in S19), the control device 150 causes the process to go to S15 and repeats S15 and subsequent steps until the predetermined time t1 elapses.

The reason why S17-S19 are performed is as follows. When it is judged in S17 that the output of the contact sensor 131 is Low, the output of the light sensor 132 corresponds to the output of the contact sensor 131, and it is deemed that a front end of the document α has passed the judgment position 130 but a rear end of the document α has not yet passed the judgment position 130. Therefore, in this case, S15 and subsequent steps are repeated while waiting for the rear end of the document α to pass the judgment position 130.

In contrast thereto, when it is judged in S17 that the output of the contact sensor 131 is High, the output of the light sensor 132 does not correspond to the output of the contact sensor 131. The reason is likely to be that although the rear end of the document α has already passed the judgment position 130 and the output of the contact sensor 131 has become High, an abnormality that a large amount of paper powders attach to the light sensor 132 occurs suddenly, which causes the output of the light sensor 132 to be not High but Low. However, there is a possibility that although a noise overlaps the Low signal from the contact sensor 131, the control device 150 misjudges the overlapped signal as a High signal. For that reason, in the present embodiment, S18 and S19 are provided in order to correctly discriminate an error in the output of the light sensor 132 that is caused by a large amount of paper powders attaching to the light sensor 132. When the output of the light sensor 132 is Low and the number (value of the counter C) of judging that the output of the contact sensor 131 is High is not less than a predetermined number, it is determined that the output of the light sensor 132 is an error.

When it is judged in S15 that the time counted by the timer T exceeds the predetermined time t1 but the output of the light sensor 132 is a Low signal and the number counted by the counter C is less than the predetermined number (YES in S15), it is judged that the document α gets jammed and retained in the carrying path 104 (paper jam), and a predetermined process for dealing paper jam is performed (S22). That is, in this case, it is probable that the rear end of the document α have not passed the judgment position 130 after the predetermined time t1 has elapsed since the front end of the document α passed the judgment position 130, and therefore this case is regarded as paper jam.

Next, an explanation is made as to a process flow (FIG. 9) after the output of the light sensor 132 is regarded as an error.

When judging in S19 in FIG. 8 that the number counted by the counter C is not less than the predetermined number, the control device 150 judges that the output signal of the light sensor 132 is an error and stands by for a predetermined time t3 (S28 in FIG. 9). The predetermined time t3 is set to be longer than the predetermined time t2 (see S20). This is because carriage of paper is controlled so that a distance between papers in carrying the document β is longer when the output of the light sensor 132 is an error than when the output of the light sensor 132 is normal.

After S28, the control device 150 judges whether the document β exists on the paper feeding tray 107 or not in accordance with a signal output from the document mounting sensor 110 (S29). When judging in S29 that the document β does not exist on the paper feeding tray 107 (NO in S29), the control device 150 completes the present document carrying job and causes the process to go to S10 in order to wait for an instruction to start a next document carrying job.

When judging in S29 that the document β exists on the paper feeding tray 107 (YES in S29), the control device 150 causes the process to go to S30 and subsequent steps in order to carry the document β. In S30, the control device 150 outputs a switching signal so as to cause the switches 151 and 152 to be in an on-state, thereby causing the smoothing circuit 145 to be in an on-state. Thus, a signal output from the contact sensor 131 is smoothed by the smoothing circuit 145 and then input to the control device 150. This process is carried out in order to remove chattering from the signal output from the contact sensor 131. For example, as illustrated in FIG. 7(*c*), a waveform of a signal obtained by smoothing the signal output from the contact sensor 131 has no chattering.

Further, at the same time as S30, the control device 150 causes a display apparatus (notification section) such as a liquid crystal display to display to a user an image indicating that a low-velocity carriage process is currently performed. This is to notify the user that carriage of paper is controlled so that a distance between paper and subsequent paper (distance between currently carried document α and currently carried document β) is longer when the output of the light sensor 132 is an error than when the output of the light sensor 132 is normal (S28). As illustrated in FIG. 7(*c*), when the signal output from the contact sensor 131 is smoothed, a waveform of the signal has a stable period and an unstable period. The distance between paper and subsequent paper is made longer in order to lengthen the stable period.

After S30, the control device 150 drives the paper feeding motor 143 so as to rotate the pickup roller 111 for a predetermined time (1-2 seconds) (S31), and sends the document β on the paper feeding tray 107 to the carrying path 104. After S31, the control device 150 monitors a smoothed signal that is obtained by the smoothing circuit 145 smoothing a signal from the contact sensor 131, and judges whether the smoothed signal is a High signal or a Low signal (S32).

When the smoothed signal is a High signal, S32 is repeated. When the smoothed signal is a Low signal, the control device 150 resets the timer T (S33), and causes the timer T to count a time. In S32, the smoothed signal being a High signal indicates that a front end of the document β has not yet passed the judgment position 130, and the smoothed signal being a Low signal indicates that a front end of the document β has passed the judgment position 130.

Thereafter, the control device 150 judges in S34 whether the time counted by the timer T exceeds the predetermined time t1 or not. When the time counted by the timer T does not exceed the predetermined time t1 (NO in S34), the control device 150 judges whether the smoothed signal is a High signal or a Low signal (S35). In S35, the smoothed signal being a High signal indicates that the rear end of the document β has passed the judgment position 130, and the smoothed signal being a Low signal indicates that the front end of the document β has passed the judgment position 130 but the rear end of the document β has not yet passed the judgment position 130.

When judging in S35 that the smoothed signal is a High signal, the control device 150 stands by for the predetermined time t3 (S36), and judges whether a document γ (document to be carried next to the document β) exists on the paper feeding tray 107 or not, in accordance with a signal output from the document mounting sensor 110 (S37). When judging in S37 that the document γ exists on the paper feeding tray 107 (YES in S37), the control device 150 causes the process to go to S31 in order to carry the document γ, and repeats S31 and subsequent steps. S36 is a step for ensuring a distance between the document β and the document γ.

Further, when judging in S37 that the document γ does not exist on the paper feeding tray 107 (NO in S37), the control device 150 completes the present document carrying job and causes the process to go to S10 in order to wait for an instruction to start a next document carrying job.

When the time counted by the timer T exceeds the predetermined time t1 but the smoothed signal continues to be Low (YES in S34), the control device 150 judges that the document β gets jammed and retained in the carrying path 104 (paper jam), and performs a predetermined process for dealing with paper jam (S38).

The above document scanning apparatus 1 includes a paper carrying device including the carrying path 104, the light sensor 132, the contact sensor 131, and the control device 150. The light sensor 132 emits light to the judgment position (predetermined position) 130 in the carrying path 104 and receives light from the judgment position 130, and in accordance with the amount of the received light, the light sensor 132 outputs a Low signal (presence-signal) indicating that a document (paper) exists at the judgment position 130 or a High signal (absence-signal) indicating that a document does not exist at the judgment position 130. The contact sensor 131 includes the protruding member (contacting member) 131*a* positioned at the judgment position 130. When a document contacts the protruding member 131*a*, the contact sensor 131 outputs the Low signal, and when a document does not contact the protruding member 131*a*, the contact sensor 131 outputs the High signal. When the light sensor 132 outputs the Low signal while the contact sensor 131 outputs the High signal, the control device 150 judges that the signal output from the light sensor 132 is an error (YES in S19).

In the above arrangement, when a large amount of paper powders attach to the light sensor 132, the light sensor 132 cannot normally emit/receive light, and consequently the light sensor 132 erroneously outputs a Low signal although no document exists at the judgment position 130. In contrast thereto, the contact sensor 131 is not designed to detect whether a document exists or not according to emission/reception of light, and therefore even when a large amount of paper powders attach to the contact sensor 131, the contact sensor 131 can correctly output a High signal when no document exists at the judgment position 130. Therefore, when the light sensor 132 outputs a Low signal while the contact sensor 131 outputs a High signal, it is considered that the light sensor 132 outputs an erroneous signal due to a large amount of paper powders attaching to the light sensor 132. Therefore, as in the document scanning apparatus 1 of the present embodiment, by providing the control device 150 for judging that a signal from the light sensor 132 is an error when the light sensor 132 outputs a Low signal while the contact sensor 131 outputs a High signal, it is possible to detect with high accuracy an error of the output signal of the light sensor 132 which error is caused by a large amount of paper powders attaching to the light sensor 132.

When the light sensor 132 outputs an erroneous signal, the output signal of the contact sensor 131 has higher reliability than the output signal of the light sensor 132. However, when the output signal of the light sensor 132 is not erroneous, the output signal of the light sensor 132 has higher reliability than the output signal of the contact sensor 131 since there is a possibility of chattering in the output signal of the contact sensor 131. For that reason, in the present embodiment, when the control device 150 judges that the error occurs within the predetermined time t1 after a front end of the document α (first paper) has passed the judgment position (YES in S19), the control device 150 judges whether a document β (second paper) to be carried next to the document α exists or not at the judgment position 130 in accordance with a signal output from the contact sensor 131 (S32, S35), and when the control device 150 does not judge that the error occurs within the predetermined time t1 (S16→S20), the control device 150 judges whether the document β exists at the judgment position 130 in accordance with a signal from the light sensor 132 (S13 after YES in S21). Consequently, an output signal with higher reliability is selected and whether the document β exists at the judgment position 130 or not is determined in accordance with the selected output signal, thereby improving accuracy in judging whether the document exists at the judgment position 130, compared with a conventional art.

Further, the document scanning apparatus 1 of the present embodiment includes the smoothing circuit 145 for smoothing a signal output from the contact sensor 131 and sending the signal to the control device 150 when the control device 150 judges that the error occurs, and the control device 150 judges whether a document exists or not at the judgment position 130 in accordance with the smoothed signal (S32, S35). Consequently, the signal output from the contact sensor 131 is smoothed so as to remove chattering from the signal, and it is judged whether the document β exists at the judgment position 130 or not in accordance with the smoothed signal, thereby improving accuracy in the judgment.

Further, when judging that the error occurs within the predetermined time t1 (YES in S19), the control device 150 of the present embodiment reduces the number of paper carried per unit time (carrying velocity) compared with when the light sensor 132 outputs normally (S28). This allows providing a longer stable period in a waveform of a signal output from the contact sensor 131 (smoothed signal), thereby further improving accuracy in the judgment in S32 and S35.

The control device 150 enlarges a distance between papers that are carried, thereby reducing the number of paper carried per unit time (carrying velocity) (see S28). The control device 150 can enlarge the distance by adjusting timing to start rotating the pickup roller 111.

In the present embodiment, although the output signal of the contact sensor 131 is not smoothed in S17, there is no problem in reliability of the judgment in S17. Rather, when S17 is performed after smoothing the output signal of the contact sensor 131, there is a possibility that reliability in the judgment in S17 drops. The reason is as follows: since the number of paper carried per unit time is not reduced in S17, smoothing the output signal of the contact sensor 131 would not allow a waveform of the smoothed signal to have a sufficiently long stable period illustrated in FIG. 7(*c*), which would result in a possibility that an output of the contact sensor 131 would not be High when in fact the output should be High.

Further, in a case where the light sensor 132 is provided at a downstream side of the contact sensor 131 in a carrying direction, when a rear end of a document passes the judgment position 130, a change of an output of the contact sensor 131 from a presence-signal to an absence-signal occurs earlier than a change of an output of the light sensor 132 from a presence-signal to an absence-signal. Consequently, even when the output of the light sensor 132 is not an error, the contact sensor 131 outputs an absence-signal (High signal) while the light sensor 132 outputs a presence-signal (Low signal), and as a result the control device 150 erroneously judges that the output of the light sensor 132 is an error. Therefore, in the document scanning apparatus 1, it is preferable that the light sensor 132 is provided at an upstream side of the contact sensor 131 in a carrying direction by a few millimeters, which prevents the above inconvenience.

Figure 10:
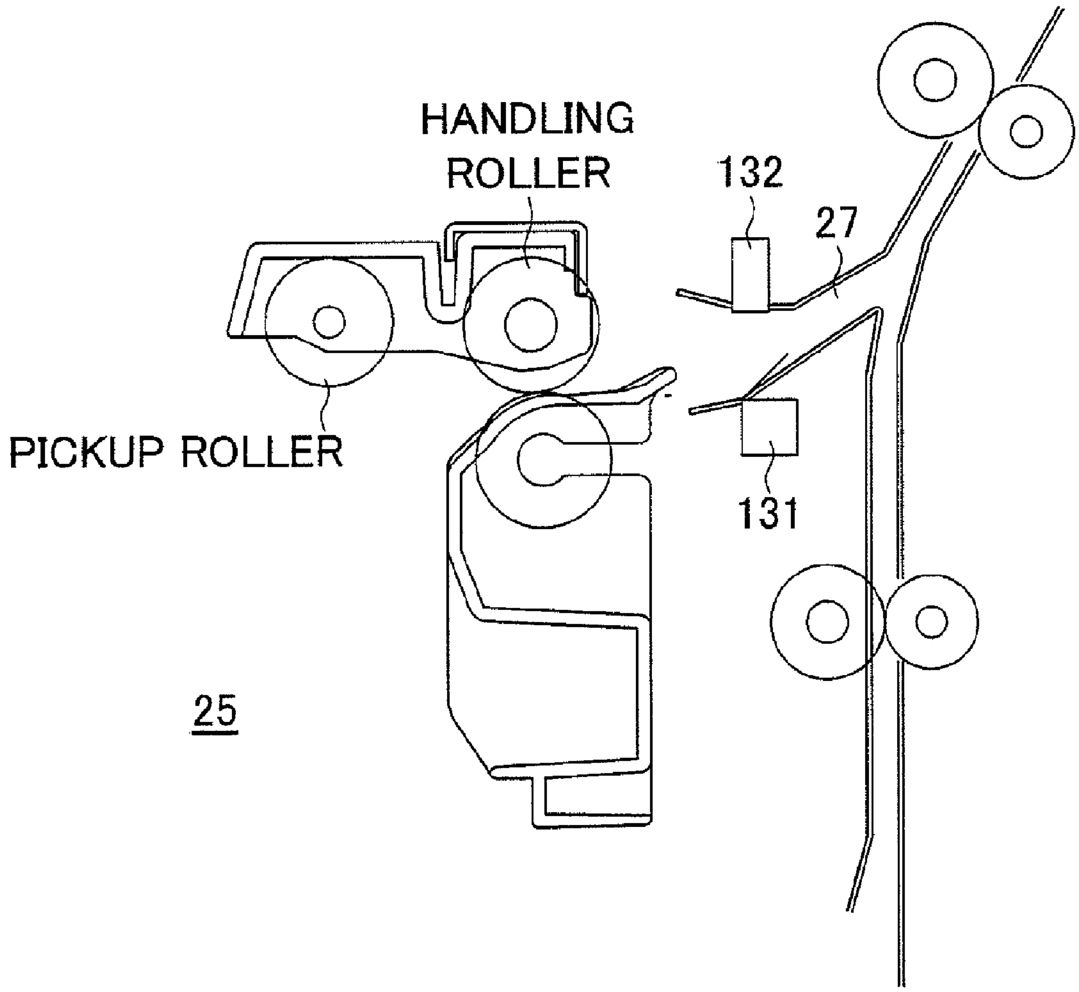
FIG. 10 is a drawing illustrating a paper feeding path, a light sensor, and a contact sensor that are included in a printing section of the present embodiment.

Further, as illustrated in FIG. 10, the present embodiment may be arranged so that the light sensor 132 and the contact sensor 131 are provided at the paper feeding path (carrying path) 27 of the printing section (printing apparatus) 11 and the control device 150 is provided in the printing section 11. This allows the paper carrying device of the present invention to be employed in a printing apparatus. That is, an error judgment process performed by the control device 150 of the present embodiment is preferably applicable to a document scanning apparatus with a document carrying system and a printing apparatus with a printing paper carrying system.

In the present embodiment, the light sensor 132 is a reflective light sensor. Since a transmission light sensor also has a problem that paper powders cause an error, the light sensor 132 may be the transmission light sensor. The transmission light sensor includes a light emitting section and a light receiving section that are provided to face each other with a carrying path therebetween. When paper does not exist at a judgment position of a carrying path, light emitted from the light emitting section is received by the light receiving section. When paper exists at the judgment position of the carrying path, light emitted from the light emitting section is blocked by the paper and therefore hardly received by the light receiving section. Therefore, when the amount of light received by the light receiving section is not less than a predetermined amount, the transmission light sensor outputs a signal indicating that paper does not exist. When the amount of light received by the light receiving section is less than the predetermined amount, the transmission light sensor outputs a signal indicating that paper exists.

The transmission light sensor may be designed to output a signal indicating that paper does not exist when the amount of received light is more than a predetermined amount, and output a signal indicating that paper exists when the amount of received light is not more than the predetermined amount.

The reflective light sensor 132 of the present embodiment is designed to output a Low signal (signal indicating that a document exists) when the amount of light is not less than a predetermined amount, and output a High signal (signal indicating that a document does not exist) when the amount of light is less than the predetermined amount. Alternatively, the reflective light sensor 132 may be designed to output a Low signal (signal indicating that a document exists) when the amount of light is more than a predetermined amount, and output a High signal (signal indicating that a document does not exist) when the amount of light is not more than the predetermined amount.

An abnormal output of a light sensor due to paper powders occurs suddenly and unexpectedly in carrying paper. Therefore, in a conventional art, this abnormal output is regarded as paper jam and carriage of paper suddenly stops, which requires removal of the remaining paper. Further, if the paper powders are accidentally wiped out in dealing with the paper jam, the malfunction does not repeat, which makes it difficult to find the cause for the malfunction. In the conventional art, such a problem can be prevented only by increasing the number of cleaning the light sensor.

The paper carrying device of one embodiment of the present invention is a paper carrying device, including: a carrying path via which paper is carried; a light sensor for (i) emitting light to a predetermined position in the carrying path, (ii) receiving light from the predetermined position, and (iii) outputting, in accordance with an amount of the received light, a presence-signal indicating that the paper exists at the predetermined position or an absence-signal indicating that the paper does not exist at the predetermined position; a contact sensor, including a contacting member positioned at the predetermined position, for outputting the presence-signal when the paper contacts the contacting member and outputting the absence-signal when the paper does not contact the contacting member; and a judgment section for judging that a signal output from the light sensor is an error, when the light sensor outputs the presence-signal while the contact sensor outputs the absence-signal. With the paper carrying device, it is possible to detect with high accuracy an error in an output signal of the light sensor due to a large amount of paper powders attaching to the light sensor.

The following explains why the paper carrying device can achieve the foregoing object. Chattering of an output of the contact sensor is a phenomenon that an output signal of the contact sensor momentary indicates a presence-signal although paper does not exist at the predetermined position. That is, an output of the light sensor being not an error and an output of the contact sensor being an error due to chattering results in a state that the light sensor outputs the absence-signal while the contact sensor outputs the presence-signal, and does not results in a state that the light sensor outputs the presence-signal while the contact sensor outputs the absence-signal. On the other hand, when a large amount of paper powders attach to the light sensor, the light sensor cannot emit/receive light normally, and consequently the light sensor erroneously outputs the presence-signal although the paper does not exist at the predetermined position. However, the contact sensor is not designed to detect presence/absence of paper in accordance with emission/reception of light and therefore even if a large amount of paper powders attach to the contact sensor, the contact sensor can correctly output the absence-signal when paper does not exist at the predetermined position. Accordingly, when the light sensor outputs the presence-signal while the contact sensor outputs the absence-signal, it is considered that this discrepancy is not derived from an error in an output of the contact sensor due to the chattering, but derived from an error in an output of the light sensor due to a large amount of paper powders attaching to the light sensor. Therefore, with the paper carrying device including a judgment section for judging that a signal output from the light sensor is an error when the light sensor outputs the presence-signal while the contact sensor outputs the absence-signal, it is possible to detect with high accuracy an error in an output signal of the light sensor which error is caused by a large amount of paper powders attaching to the light sensor.

Further, when an output of the light sensor is an error, an output of the contact sensor is more reliable than the output of the light sensor. However, when the output of the light sensor is not an error, the output of the light sensor is more reliable than the output of the contact sensor since there is a possibility of chattering in the output of the contact sensor. For that reason, it is preferable to arrange the paper carrying device of the present invention so that the judgment section judges whether first paper exists or not at the predetermined position in accordance with a signal output from the light sensor, when the judgment section judges that a signal output from the light sensor within a predetermined time after judging that the first paper exists at the predetermined position is an error, the judgment section judges, in accordance with a signal output from the contact sensor, whether second paper subsequent to the first paper exists at the predetermined position or not, and when the judgment section does not judge that the signal output from the light sensor within the predetermined time is an error, the judgment section judges, in accordance with a signal output from the light sensor, whether the second paper exists at the predetermined position or not. With the arrangement, after the first paper has passed the predetermined position, an output of more reliable sensor is selected, and it is judged whether the second paper exists or not at the predetermined position in accordance with the selected output. This allows higher accuracy in judging whether paper exists or not at the predetermined position than a conventional art.

It is preferable to arrange the paper carrying device of the present invention so as to further include a smoothing process section for smoothing the signal output from the contact sensor and thereafter transmitting the signal to the judgment section, when the judgment section judges that the signal output from the light sensor within the predetermined time is an error. With the arrangement, a signal output from the contact sensor is smoothed and thus chattering is removed from the signal, and it is judged whether the second paper exists at the predetermined position or not in accordance with the smoothed signal. This allows increasing accuracy in the judgment.

When the signal output from the contact sensor is smoothed, a stable period and an unstable period coexist in a signal waveform. As the stable period is longer, the smoothed signal is more reliable. Therefore, it is preferable to arrange the paper carrying device of the present invention so as to further include a carriage control section for setting the number of paper carried per unit time to be smaller when the control section judges that the signal output from the light sensor within the predetermined time is an error than when the control section does not judge that the signal output from the light sensor within the predetermined time is an error. With the arrangement, when it is judged that the signal output from the light sensor within the predetermined time is an error and it is judged whether the second paper exists at the predetermined position or not in accordance with the signal output from the contact sensor (smoothed signal), the number of paper carried per unit time is set to be smaller so that a stable period of the waveform of the signal is made longer. This allows increasing accuracy in judging whether the paper exists at the predetermined position or not.

The carriage control section can set the number of paper carried per unit time to be smaller by enlarging a distance between paper to be carried and subsequent paper to be carried. The carriage control section can enlarge the distance by controlling timing to start rotating a pickup roller.

Further, there is a case where a noise momentarily overlapping a signal causes momentary discrepancy between indication by the output signal of the light sensor and indication by the output signal of the contact sensor. Therefore, it is preferable to arrange the paper carrying device so that the judgment section repeatedly performs a first process for judging whether the light sensor outputs the presence-signal or the absence-signal and a second process for judging whether the contact sensor outputs the presence-signal or the absence-signal, and the judgment section judges that the signal output from the light sensor is an error only when the first process continues to judge that the light sensor outputs the presence-signal and the number of the second process judging that the contact sensor outputs the absence-signal is not less than a predetermined number. With the arrangement, only when it continues to be judged that the light sensor outputs the presence-signal and the number of the second process judging that the contact sensor outputs the absence-signal is not less than the predetermined number, the signal output from the light sensor is judged as an error. Consequently, it is possible to prevent wrongly considering the above discrepancy due to the momentary noise as an error due to paper powders.

In a case where the light sensor is provided at a downstream side of the contact sensor in the carrying direction, when a rear end of paper passes the predetermined position, a change of an output of the contact sensor from a presence-signal to an absence-signal occurs earlier than a change of an output of the light sensor from a presence-signal to an absence-signal. Consequently, in the case where the light sensor is provided at the downstream side of the contact sensor in the carrying direction, there arises a state where the contact sensor outputs the absence-signal while the light sensor outputs the presence-signal although the output of the light sensor is not an error. This state results in an inconvenience that the output of the light sensor is wrongly judged as an error. Therefore, it is preferable to arrange the paper carrying device of the present invention so that the light sensor and the contact sensor are provided along the carrying path in such a manner that the light sensor is positioned at an upstream side of the contact sensor in a carrying direction. This arrangement allows avoiding the above inconvenience.

Further, it is preferable to arrange the paper carrying device so as to further include a notification section for notifying a user of information indicating that paper is carried at a low velocity, when the control section judges that the signal output from the light sensor within the predetermined time is an error. With the arrangement, it is possible to notify the user that paper is carried at a low velocity due to some cause, thereby preventing the user from being annoyed by sudden lowering of a carrying velocity.

The light sensor is a reflective light sensor or a transmission light sensor.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A paper carrying device, comprising:

a carrying path via which paper is carried;

a light sensor for (i) emitting light to a predetermined position in the carrying path, (ii) receiving light from the predetermined position, and (iii) outputting, in accordance with an amount of the received light, a presence-signal indicating that the paper exists at the predetermined position or an absence-signal indicating that the paper does not exist at the predetermined position;

a contact sensor, including a contacting member positioned at the predetermined position, for outputting the presence-signal when the paper contacts the contacting member and outputting the absence-signal when the paper does not contact the contacting member; and a judgment section for judging that a signal output from the light sensor is an error, when the light sensor outputs the presence-signal while the contact sensor outputs the absence-signal.

2. The paper carrying device as set forth in claim 1, wherein the judgment section judges whether first paper exists or not at the predetermined position in accordance with a signal output from the light sensor, when the judgment section judges that a signal output from the light sensor within a predetermined time after judging that the first paper exists at the predetermined position is an error, the judgment section judges, in accordance with a signal output from the contact sensor, whether second paper subsequent to the first paper exists at the predetermined position or not, and when the judgment section does not judge that the signal output from the light sensor within the predetermined time is an error, the judgment section judges, in accordance with a signal output from the light sensor, whether the second paper exists at the predetermined position or not.

3. The paper carrying device as set forth in claim 2, further comprising a smoothing process section for smoothing the signal output from the contact sensor and thereafter transmitting the signal to the judgment section, when the judgment section judges that the signal output from the light sensor within the predetermined time is an error.

4. The paper carrying device as set forth in claim 3, further comprising a carriage control section for setting the number of paper carried per unit time to be smaller when the control section judges that the signal output from the light sensor within the predetermined time is an error than when the control section does not judge that the signal output from the light sensor within the predetermined time is an error.

5. The paper carrying device as set forth in claim 4, wherein the carriage control section sets the number of paper carried per unit time to be smaller by enlarging a distance between paper to be carried and subsequent paper to be carried.

6. The paper carrying device as set forth in claim 5, further comprising a pickup roller for sending the paper to the carrying path, the carriage control section enlarges the distance by controlling timing to start rotating the pickup roller.

7. The paper carrying device as set forth in claim 2, wherein the judgment section repeatedly performs a first process for judging whether the light sensor outputs the presence-signal or the absence-signal and a second process for judging whether the contact sensor outputs the presence-signal or the absence-signal, and the judgment section judges that the signal output from the light sensor is an error only when the first process continues to judge that the light sensor outputs the presence-signal and the number of the second process judging that the contact sensor outputs the absence-signal is not less than a predetermined number.

8. The paper carrying device as set forth in claim 1, wherein the light sensor and the contact sensor are provided along the carrying path in such a manner that the light sensor is positioned at an upstream side of the contact sensor in a carrying direction.

9. The paper carrying device as set forth in claim 4, further comprising a notification section for notifying a user of information indicating that paper is carried at a low velocity, when the control section judges that the signal output from the light sensor within the predetermined time is an error.

10. The paper carrying device as set forth in claim 1, wherein the light sensor is a reflective light sensor or a transmission light sensor.

11. A document scanning apparatus, comprising:

a carrying path via which a document is carried;

a light sensor for (i) emitting light to a predetermined position in the carrying path, (ii) receiving light from the predetermined position, and (iii) outputting, in accordance with an amount of the received light, a presence-signal indicating that the document exists at the predetermined position or an absence-signal indicating that the document does not exist at the predetermined position;

a contact sensor, including a contacting member positioned at the predetermined position, for outputting the presence-signal when the document contacts the contacting member and outputting the absence-signal when the document does not contact the contacting member; and a judgment section for judging that a signal output from the light sensor is an error, when the light sensor outputs the presence-signal while the contact sensor outputs the absence-signal.

12. A printing apparatus, comprising:

a carrying path via which printing paper is carried;

a light sensor for (i) emitting light to a predetermined position in the carrying path, (ii) receiving light from the predetermined position, and (iii) outputting, in accordance with an amount of the received light, a presence-signal indicating that the printing paper exists at the predetermined position or an absence-signal indicating that the printing paper does not exist at the predetermined position;

a contact sensor, including a contacting member positioned at the predetermined position, for outputting the presence-signal when the printing paper contacts the contacting member and outputting the absence-signal when the printing paper does not contact the contacting member; and a judgment section for judging that a signal output from the light sensor is an error, when the light sensor outputs the presence-signal while the contact sensor outputs the absence-signal.

* * * * *